United States Patent Office 3,214,430
Patented Oct. 26, 1965

3,214,430
3,5-DIALKYLATED-2-AMINO-6-ARYL-4(3H)-
PYRIMIDINONES
Kurt J. Rorig, 337 Hager Lane, Glenview, and Hans A.
Wagner, 8712 Skokie Blvd., Skokie, Ill.
No Drawing. Filed June 4, 1963, Ser. No. 285,218
9 Claims. (Cl. 260—256.4)

This invention relates to 3,5-dialkylated-2-amino-6-aryl-4(3H)-pyrimidinones and processes for the manufacture thereof. More particularly, this invention provides new an inherently useful chemical compounds of the formula

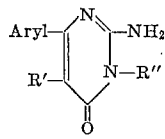

wherein the aryl radical called for is phenyl, naphthyl, or like monovalent aromatic hydrocarbon grouping optionally substituted in each instance by an alkyl or alkoxy grouping, or by halogen; and R' and R" each represent an alkyl, alkenyl, or alkynyl radical among which the alkyl radical represented by R" can be substituted by a hydroxy, alkoxy, benzoxy, and/or optionally-alkylated amino grouping.

Preferred embodiments of the described aryl radical are phenyl and chlorophenyl groupings, the halogen constituent being ortho, meta, or para ad libitum to the carbon through which the aryl nucleus attaches to the pyrimidinone ring.

The alkyl, alkenyl, and alkynyl radicals contemplated are desirably of lower order, i.e., contain no more than 8 carbon atoms. Illustrative of lower alkyl radicals are methyl, ethyl, propyl, isopropyl, butyl, isobutyl, sec-butyl, tert-butyl, pentyl, neopentyl, hexyl, isohexyl, heptyl, octyl, and like —$C_nH_{2n+1}$ groupings wherein $n$ represents a positive integer less than 9. Lower alkenyl and lower alkynyl radicals include vinyl, allyl, 2-methylallyl, butenyl (3 isomers), ethynyl, propynyl (2 isomers), and such other groupings as may be thought of as deriving by appropriate elimination of hydrogen from a lower alkyl grouping (exclusive of methyl) in favor of a double or triple bond.

When R" comprehends an alkoxy grouping, the latter is likewise of lower order, i.e., lower alkyl—O— and can be substituted on any one of the carbon atoms which comprise the alkyl grouping wherein it appears. The same acriticality of positioning applies to hydroxy, benzoxy, and/or optionally-alkylated amino groupings present.

The expression "optionally-alkylated amino groupings" subsumes both the primary amino radical, NH₂, and secondary and tertiary amino radicals resulting from the substitution of 1 or 2 alkyl radicals, respectively, for hydrogen therein—especially lower alkyl radicals, as hereinbefore defined. The alkyl radicals present when R" comprehends a tertiary amino grouping may either be discreet, thus

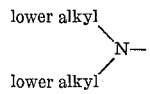

or they may be joined together directly or through oxygen or a second nitrogen atom to compose cyclic amino radicals optimally but not necessarily exclusively comprising at least 4 and as many as 6 carbon atoms as illustrated in the examples hereafter. Somewhat more broadly representative of the cyclic amino radicals contemplated are pyrrolidino, methylpyrrolidino, dimethylpyrrolidino, trimethylpyrrolidino, piperidino, methylpiperidino, dimethylpiperidino, methylethylpiperidino, morpholino, piperazino, methylpiperazino, ethylpiperazino, and like monovalent, 5- and 6-membered heterocyclic groupings. The terminal "ino" in the radical names set forth denotes attachment of the radicals thus characterized via nitrogen.

Preferred embodiments of R' are methyl, allyl, and 2-propynl radicals. Preferred embodiments of R" are lower alkyl, allyl, and propynyl radicals, and radicals of the formulas

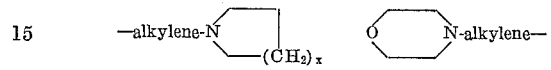

wherein the alkylene groupings are divalent, saturated, acyclic, straight- or branched-chain, hydrocarbon radicals containing more than 1 and fewer than 4 carbon atoms, and $x$ is a positive integer less than 3.

Those skilled in the art will recognize that 2-amino-pyrimidines of the type with which we are here concerned can and do reversibly tautomerize to corresponding imines, thus

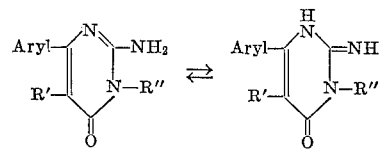

the proportions of the two tautomers present in any given circumstance being dependent upon the physical state of the substance involved, and its environment: whether it be solid or liquid and, if dissolved, in what solvent and at what pH. Accordingly, the naming and enformulation of the subject compounds as 2-amines and not 2-imines is a matter of convenience only; both tautomeric forms are within the ambit of the described invention.

Equivalent to the amine bases of this invention for the purposes here described are corresponding non-toxic acid addition salts of the formula

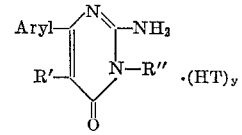

wherein Aryl, R', and R" retain the meanings previously assigned; T represents 1 equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in pharmaceutical dosage; and $y$ represents a positive integer less than 5, its precise value being dependent upon the number of basic nitrogen atoms involved in salt formation.

The compounds to which this invention relates are useful by reason of their valuable pharmacological properties. Thus, for example, they are diuretics adapted to block the effect of desoxycorticosterone acetate (DCA) on urinary sodium and potassium. The latter, anti-DCA activity is the more remarkable in that the superficially-related prior art diuretic, 2-amino-4-hydroxy-5-methyl-6-phenyl-4-pyrimidinol, has been found to be without effect in standardized tests for such activity. Other valuable pharmcological properties variously inhering in the instant compounds are: anti-ulcer, pepsin-inhibiting, antihypercholesterolemic, antibiotic (v. *D. pneumoniae, T. mentagrophytes,* and *C. vulgaris*), and anti-inflammatory.

Manufacture of the claimed compounds proceeds by heating an appropriate pyrimidinol

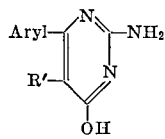

with a selected alkyl halide

R″X in an alcoholic solvent medium containing an acid acceptor such as potassium hydroxide or sodium methoxide, and with sodium iodide to catalyze the reaction if desired. (The meanings of Aryl, R′, and R″ in the foregoing formulas remain as before; X represents chlorine, bromine, or iodine.)

Conversion of the basic amines of this invention to corresponding acid addition salts is accomplished by mixing the bases with from 1 to 4 equivalents, as indicated, of any of various inorganic and strong organic acids, the anionic portion of which conforms to T as hereinbefore defined.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

*Example 1*

2 - amino - 3,5 - dimethyl - 6 - phenyl - 4(3H) - pyrimidinone.—A mixture of 30 parts of 2 - amino - 5 - methyl-6 - phenyl - 4 - pyrimidinol, 80 parts of methyl iodide, 12 parts of potassium hydroxide, and 160 parts of 95% ethanol is heated at the boiling point under reflux for 1¼ hours, then cooled and filtered. The filtrate is warmed to approximately 50° and diluted thereat with 400 parts of water. The white granular solid which precipitates on cooling, isolated by filtration and recrystallized from ethanol, affords 2 - amino-3,5-dimethyl-6-phenyl-4(3H)-pyrimidinone melting at approximately 216–217°. The product has the formula

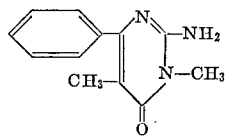

*Example 2*

2 - amino - 3 - ethyl-5-methyl-6-phenyl-4(3H)-pyrimidinone.—A mixture of 60 parts of 2-amino-5-methyl-6-phenyl-4-pyrimidinol, 63 parts of ethyl iodide, 20 parts of potassium hydroxide, and 320 parts of 95% ethanol is heated at the boiling point under reflux for 1 hour, then cooled. Insoluble solids are filtered off and combined with the oil which remains after solvent is removed from the filtrate by vacuum distillation. The ombined materials are washed with 700 parts of aqueous 2% sodium hydroxide, then crystallized from 175 parts of benzene. The hair-like needles thus obtained, upon recrystallization from aqueous 40% ethanol, afford 2-amino-3-ethyl-5-methyl-6-phenyl-4(3H)-pyrimidinone melting at 184.5–186°. The product has the formula

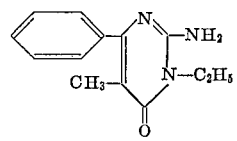

*Example 3*

2 - amino - 5 - methyl - 6 - phenyl-3-propyl-4(3H)-pyrimidinone.—Substitution of 87 parts of propyl iodide for the methyl iodide called for in Example 1 affords, by the procedure there detailed, 2-amino-5-methyl-6-phenyl-3-propyl-4-(3H)-pyrimidinone melting at 240–242°. The product has the formula

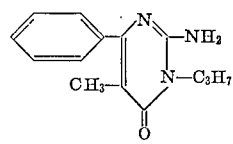

*Example 4*

2 - amino - 5 - methyl - 3 - octyl-6-phenyl-4(3H)-pyrimidinone.—A mixture of 30 parts of 2-amino-5-methyl-6-phenyl-4-pyrimidinol, 90 parts of octyl bromide, 12 parts of potassium hydroxide, 22 parts of sodium iodide, and 175 parts of 95% ethanol is heated at the boiling point under reflux for 5 hours, then cooled. Insoluble solids are filtered off and combined with the residue remaining after solvent is removed by vacuum distillation from the filtrate. The combined materials are washed with a mixture of 350 parts of aqueous 2% sodium hydroxide and 500 parts of ether, then crystallized from ethanol to afford 2 - amino - 5 - methyl-3-octyl-6-phenyl-4(3H)-pyrimidinone melting at approximately 199–200°. The product has the formula

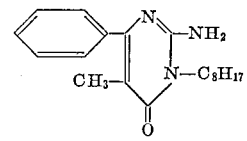

*Example 5*

3 - allyl - 2 - amino - 5 - methyl - 6 - phenyl-4(3H)-pyrimidinone.—To a solution of 30 parts of 2-amino-5-methyl-6-phenyl-4-pyrimidinol and 12 parts of potassium hydroxide in 185 parts of 95% ethanol at 10° is added, over a 2 hour period during which the temperature rises to around 25°, 100 parts of allyl bromide. The resultant mixture is maintained with agitation at approximately 25° for 8 hours, whereupon 5 parts of potassium hydroxide is introduced and agitation at 25° resumed for a further 48 hours. Solvent is removed by vacuum distillation and the residue washed with 700 parts of aqueous 2% sodium hydroxide and thereupon taken up in 600 parts of 5% hydrochloric acid. The acid solution is washed with ether, then neutralized with ammonium hydroxide. The semi-solid oil which precipitates is separated by decantation and taken up in 80 parts of boiling 95% ethanol. The boiling ethanol solution is diluted with 35 parts of hot water. From the resultant solution, on cooling, there crystallizes 3 - allyl-2-amino-5-methyl-6-phenyl-4(3H)-pyrimidinone which, recrystallized from 95% ethanol, melts at 177–179°. The product has the formula

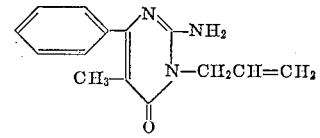

Example 6

*2 - amino - 5 - methyl - 6 - phenyl - 3-(2-propynyl)-4 (3H)-pyrimidinone.*—To a solution of approximately 20 parts of 2-amino-5-methyl-6-phenyl-4-pyrimidinol and 7 parts of sodium methoxide in 500 parts of anhydrous ethanol is added 13 parts of 3-bromo-1-propyne. The resultant mixture is maintained with agitation at room temperatures for 1 hour, then heated at the boiling point under reflux with agitation overnight. Solvent is removed by vacuum distillation, and the residue is suspended in a solution of 4 parts of sodium hydroxide in 800 parts of water. After 2 hours, solids are filtered off and washed on the filter until the washings are neutral to litmus, then dried in air, recrystallized from methanol, and finally washed with ether. The product thus isolated is 2-amino-5 - methyl - 6-phenyl-3-(2-propynyl)-4(3H)-pyrimidinone melting at approximately 215°, the formula of which is

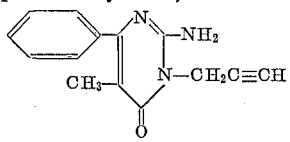

Example 7

A. *2-amino-6-phenyl - 5 - (2-propynyl) - 4 - pyrimidinol.*—A mixture of 78 parts of ethyl α-(2-propynyl) benzoylacetate and 54 parts of guanidine carbonate in 400 parts of anhydrous ethanol is heated at the boiling point under reflux for 24 hours. Solvent is thereupon removed by vacuum distillation and the residue suspended in 1000 parts of water. The suspension is neutralized with glacial acetic acid. The insoluble solids are filtered off; consecutively washed on the filter with water, cold acetone, and ether; and recrystallized from methanol to give 2-amino - 6 - phenyl-5(2-propynyl)-4-pyrimidinol melting at 261–263°.

B. *2-amino-6-phenyl - 3,5 - di(2 - propynyl)-4(3H) pyrimidinone.*—To a solution of 7 parts of sodium methoxide and 300 parts of methanol is added 22 parts of 2-amino-6-phenyl-5-propynyl-4-pyrimidinol. The resultant mixture is maintained with agitation at room temperatures for 1 hour, whereupon 16 parts of 3-bromo-1-propyne is introduced. The mixture thus obtained is maintained with agitation at room temperature for 1 hour, then heated at the boiling point under reflux with agitation overnight. Solvent is removed by vacuum distillation and the residue suspended in a solution of 4 parts of sodium hydroxide in 800 parts of water. After 2 hours, insoluble solids are filtered off and washed on the filter till the washings are neutral to litmus, then dried in air, and recrystallized from methanol. The product thus isolated is 2-amino-6-phenyl-3,5-di(2-propynyl) - 4(3H) pyrimidinone which, washed with ether and dried in air, melts at 220–222°. The product has the formula

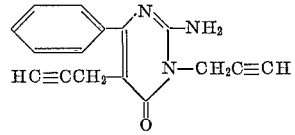

Example 8

*2-amino-3-(2-hydroxyethyl) - 5 - methyl-6 - phenyl-4 (3H)-pyrimidinone.*—Substitution of 10 parts of 2-chloroethanol for the 3-bromo-1-propyne called for in Example 6 affords, by the procedure there detailed, 2-amino-3-(2-hydroxyethyl) - 5 - methyl-6-phenyl - 4(3H)-pyrimidinone melting at approximately 217–218°. The product has the formula

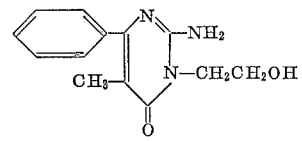

Example 9

*2-amino-3-(3-hydroxypropyl) - 5 - methyl - 6 - phenyl-4(3H)-pyrimidinone.*—To a solution of 7 parts of sodium methoxide in 500 parts of anhydrous ethanol is added approximately 20 parts of 2-amino-5-methyl-6-phenyl-4-pyrimidinol. The resultant mixture is maintained with agitation at room temperatures for 1 hour, whereupon 10 parts of 3-chloro-1-propanol is introduced and the mixture thus obtained is held at room temperatures with agitation for 1 hour, then heated at the boiling point under reflux with agitation overnight. Solvent is removed by vacuum distillation and the residue suspended in a solution of 4 parts of sodium hydroxide in 800 parts of water. After 2 hours, insoluble solids are filtered off, washed on the filter with water until the washings are neutral to litmus, dried in air, and recrystallized from methanol. The product thus isolated is 2-amino-3-(3-hydroxypropyl)-5-methyl - 6 - phenyl-4(3H)-pyrimidinone which, washed with ether and dried in air, melts at approximately 202°. The product has the formula

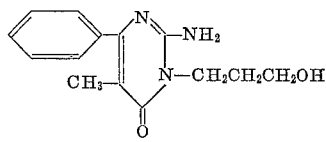

Example 10

*2-amino-3-(2-hydroxypropyl) - 5 - methyl-6-phenyl-4 (3H)-pyrimidinone.*—Substitution of 11 parts of 1-chloro-2-propanol for the 3-chloro-1-propanol called for in Example 9 affords, by the procedure there detailed, 2-amino-3-(2-hydroxypropyl)-5-methyl-6-phenyl - 4(3H) - pyrimidinone melting at approximately 170°. The product has the formula

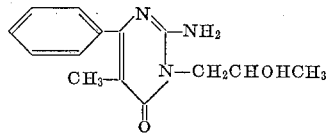

Example 11

*5 - allyl-2-amino-3-(2 - hydroxyethyl)-6-phenyl-4(3H)-pyrimidinone.*—To a solution of 7 parts of sodium methoxide in 350 parts of methanol is added 22 parts of 5-allyl-2-amino-6-phenyl-4-pyrimidinol. The resultant mixture is maintained at room temperatures for 1 hour with agitation, whereupon 16 parts of 2-bromoethanol is introduced. Agitation at room temperatures is resumed for 1 hour, at which point the mixture is heated at the boiling point under reflux with agitation overnight. Solvent is thereupon removed by vacuum distillation and the residue taken up in a solution of 4 parts of sodium hydroxide in 800 parts of water. After 2 hours, insoluble solids are filtered off, washed with water until the washings are neutral to litmus, dried in air, and recrystallized from methanol. The product thus isolated, washed on the filter with ether and dried in air, is 5-allyl-2-amino-3-(2-hydroxyethyl)-6-phenyl-4(3H)-pyrimidinone melting at approximately 193–194°. The product has the formula

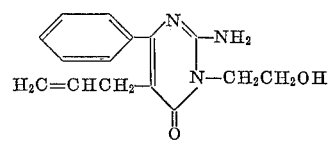

Example 12

*2-amino-3-(2-hydroxyethyl)-6-phenyl-5-(2 - propynyl)-4(3H)-pyrimidinone.*—Substitution of 11 parts of 2-chloroethanol for the 3-bromo-1-propyne called for in Example 7B affords, by the procedure there detailed, 2-amino-3-(2 - hydroxyethyl)-6-phenyl - 5 - (2 - propynyl)-

4(3H)-pyrimidinone melting at 206–208°. The product has the formula

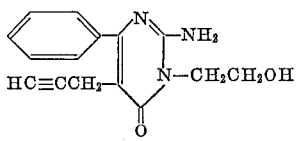

Example 13

*2 - amino-6-(p-chlorophenyl)- 3 -(2 - hydroxyethyl)-5-methyl-4(3H)-pyrimidinone.*—To 400 parts of absolute ethanol is consecutively added, with agitation at room temperatures, 7 parts of sodium methoxide followed by 18 parts of 2-amino-6-(p-chlorophenyl)-5-methyl-4-pyrimidinol. Agitation at room temperatures is continued for ½ hour, whereupon 8 parts of 2-chloroethanol is introduced. Agitation at room temperatures is resumed for 1 hour, at which point the reaction mixture is heated to the boiling point under reflux and maintained thereat with agitation for 18 hours. The resultant mixture is filtered and the filtrate stripped of solvent by vacuum distillation. The viscous oily residue solidifies on trituration with 500 parts of aqueous 1% sodium hydroxide. The white solid thus obtained is isolated by filtration, washed with water, dried in air, and recrystallized from absolute ethanol to give 2-amino-6-(p-chlorophenyl)-3-(2 - hydroxyethyl)-5-methyl-4(3H)-pyrimidinone melting in the range 213–215°. The product has the formula

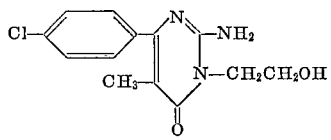

Example 14

*2 - amino-6-(o-chlorophenyl)- 3 -(2 - hydroxyethyl)-5-methyl-4(3H)-pyrimidinone.*—Substitution of 18 parts of 2-amino-6-(o-chlorophenyl)-5-methyl-4-pyrimidinol [prepared by heating ethyl o-chlorobenzoylacetate with methyl iodide in ethanolic sodium ethoxide to obtain ethyl 2-(o-chlorobenzoyl)propionate which, in turn, is heated with ethanolic guanidine carbonate] for the 2-amino-6-(p-chlorophenyl)-5-methyl-4-pyrimidinol called for in Example 13 affords, by the procedure there detailed, 2-amino-6-(o-chlorophenyl)-3-(2 - hydroxyethyl)-5-methyl-4(3H)-pyrimidinone, of the formula

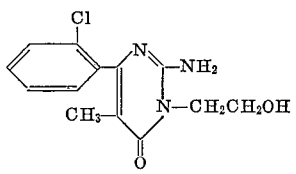

Example 15

*2 - amino-3-(3 - methoxypropyl)-5-methyl - 6 - phenyl-4(3H)-pyrimidinone.*—Substitution of 15 parts of 3-chloropropyl methyl ether for the 3-bromo-1-propyne called for in Example 6 affords, by the procedure there detailed, 2 - amino-3-(3 - methoxypropyl) - 5 - methyl - 6 - phenyl-4(3H)-pyrimidinone, having the formula

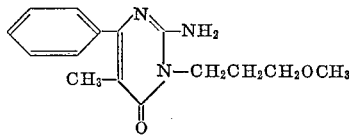

Example 16

*2-amino-3-(2 - ethoxyethyl)-5-methyl-6-phenyl-4(3H)-pyrimidinone.*—Substitution of 16 parts of 2-bromoethyl ethyl ether for the 3-bromo-1-propyne called for in Example 6 affords, by the procedure there detailed, 2-amino-3-(2-ethoxyethyl)-5-methyl - 6 - phenyl-4(3H)-pyrimidinone melting at approximately 172–173°. The product has the formula

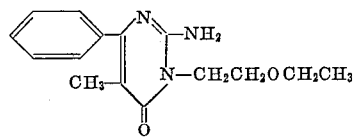

Example 17

*2 - amino - 5 - methyl - 3-(2-phenoxyethyl)-6-phenyl-4 (3H)-pyrimidinone.*—Substitution of 17 parts of 2-chloroethyl phenyl ether for the 3-bromo-1-propyne called for in Example 6 affords, by the procedure there detailed, 2-amino - 5 - methyl - 3-(2-phenoxyethyl)-6-phenyl-4(3H)-pyrimidinone melting at approximately 184–185°. The product has the formula

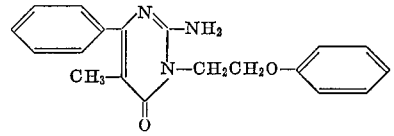

Example 18

*2 - amino - 5 - methyl-3-(3 - phenoxypropyl)-6-phenyl-4(3H)-pyrimidinone.*—Substitution of 19 parts of 3-chloropropyl phenyl ether for the 3-bromo-1-propyne called for in Example 6 affords, by the procedure there detailed, 2 - amino - 5-methyl - 3 - (3-phenoxypropyl)-6-phenyl-4 (3H)-pyrimidinone, the formula of which is

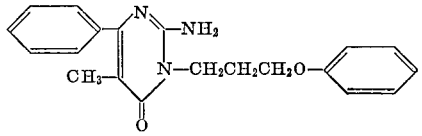

Example 19

*2 - amino - 3-(2-dimethylaminoethyl)-5-methyl-6-phenyl-4(3H)-pyrimidinone.*—To a solution of approximately 20 parts of 2-amino-5-methyl-6-phenyl-4-pyrimidinol and 7 parts of sodium methoxide in 300 parts of anhydrous ethanol is added approximately 14 parts of 2-dimethylaminoethyl chloride hydrochloride dissolved in a solution of 6 parts of sodium methoxide in 150 parts of anhydrous ethanol. The resultant mixture is maintained with agitation at room temperatures for 1 hour, then heated at the boiling point under reflux with continued agitation overnight. Solvent is removed by vacuum distillation and the residue suspended in a solution of 4 parts of sodium hydroxide in 800 parts of water. After 2 hours, insoluble solids are filtered off, washed on the filter with water until the washings are neutral to litmus, dried in air, and recrystallized from methanol. The recrystallized material, washed on the filter with ether and dried in air, is 2-amino-3 - (2 - dimethylaminoethyl) - 5-methyl-6-phenyl-4(3H)-pyrimidinone melting at 195–197°. The product has the formula

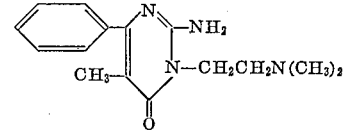

Example 20

*2 - amino - 3-(3-diethylaminopropyl)-5-methyl-6-phenyl-4(3H)-pyrimidinone.*—Substitution of 16 parts of 3-diethylaminopropyl chloride hydrochloride for the 2-dimethylaminoethyl chloride hydrochloride called for in Example 19 affords, by the procedure there detailed, 2-amino- 3 - (3 - diethylaminopropyl)-5-methyl-6-phenyl-4(3H)-pyrimidinone, having the formula

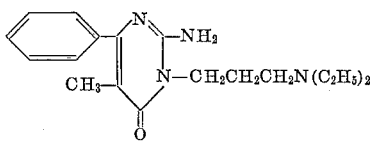

Example 21

*2 - amino - 5-methyl-6-phenyl-3-(3-pyrrolidinopropyl)-4(3H)-pyrimidinone.*—To a solution of approximately 20 parts of 2-amino-5-methyl-6-phenyl-4-pyrimidinol and 7 parts of sodium methoxide in 300 parts of anhydrous ethanol is added 17 parts of N-(3-chloropropyl)pyrrolidine dissolved in a solution of 6 parts of sodium methoxide in 200 parts of anhydrous ethanol. The resultant mixture is maintained with agitation at room temperatures for 1 hour, then heated at the boiling point under reflux with continued agitation overnight. Solvent is removed by vacuum distillation and the residue suspended in a solution of 4 parts of sodium hydroxide in 800 parts of water. After 2 hours, insoluble solids are filtered off, washed on the filter with water until the washings are neutral to litmus, dried in air, and recrystallized from methanol. The recrystallized material is washed on the filter with ether. The product thus isolated is 2-amino-5-methyl-6-phenyl - 3-(3-pyrrolidinopropyl)-4(3H)-pyrimidinone, of the formula

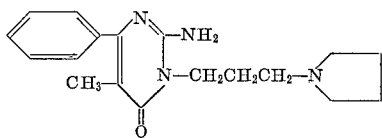

Example 22

*2 - amino - 5 - methyl - 6-phenyl - 3-(2-piperidinoethyl) 4(3H)-pyrimidinone.*—Substitution of approximately 18 parts of N-(2-chloroethyl)piperidine for the N-(3-chloropropyl)-pyrrolidine called for in Example 21 affords, by the procedure there detailed, 2-amino-5-methyl-6-phenyl-3-(2-piperidinoethyl)-4(3H)-pyrimidinone melting at 203–205°. The product has the formula

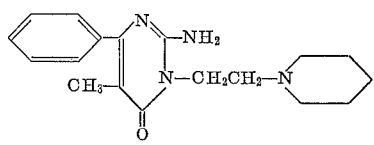

Example 23

*2 - amino - 5 - methyl-3-(2-morpholinoethyl)-6-phenyl-4(3H)-pyrimidinone.*—Substitution of approximately 19 parts of N-(2-chloroethyl)morpholine for the N-(3-chloropropyl)pyrrolidine called for in Example 21 affords, by the procedure there detailed, 2-amino-5-methyl-3-(2-morpholinoethyl)-6-phenyl-4(3H)-pyrimidinone melting at approximately 234–235°. The product has the formula

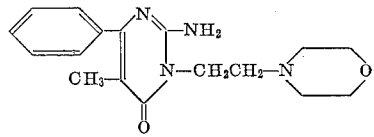

Example 24

*2 - amino - 5-methyl-3-(3-morpholinopropyl)-6-phenyl-4(3H)-pyrimidinone.*—Substitution of approximately 20 parts of N-(3-chloropropyl)morpholine for the N-(3-chloropropyl)pyrrolidine called for in Example 21 affords, by the procedure there detailed, 2-amino-5-methyl-3-(3-morpholinopropyl) - 6 - phenyl - 4(3H)-pyrimidinone, the formula of which is

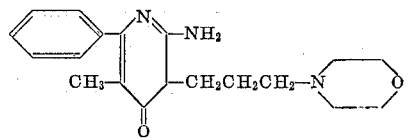

What is claimed is:
1. A compound of the formula

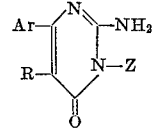

wherein Ar represents a member of the group consisting of radicals of the formulas

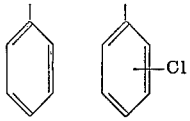

R represents a member of the group consisting of radicals of the formulas

—$CH_3$    $CH_2CH=CH_2$    —$CH_2C\equiv CH$ and Z represents a member of the group consisting of radicals of the formulas —$C_nH_{2n+1}$    —$CH_2CH=CH_2$    —$CH_2C\equiv CH$ -alkylene—OH    -alkylene—O—$C_nH_{2n+1}$ $n$ in the foregoing formulas being a positive integer less than 9 and the alkylene radicals called for being those containing more than 1 and fewer than 4 carbon atoms.

2. A compound of the formula

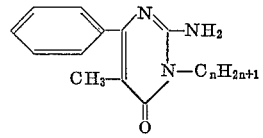

wherein $n$ represents a positive integer less than 9.

3. 2 - amino-3-ethyl-5-methyl-6-phenyl-4(3H) - pyrimidinone.

4. 2 - amino-5-methyl-6-phenyl-3-(2-propynyl)-4(3H)-pyrimidinone.

5. A compound of the formula

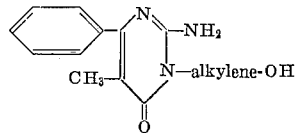

wherein the alkylene radical called for contains more than 1 and fewer than 4 carbon atoms.

6. 2 - amino - 3 - (2-hydroxyethyl)-5-methyl-6-phenyl-4(3H)-pyrimidinone.

7. 2 - amino - 3 - (2-hydroxyethyl)-6-phenyl-5-(2-propynyl)-4(3H)-pyrimidinone.

8. A compound of the formula

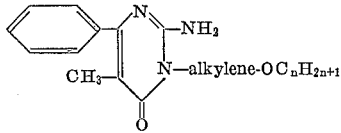

wherein the alkylene radical called for contains more than 1 and fewer than 4 carbon atoms and $n$ represents a positive integer less than 9.

9. 2-amino-3-(2-ethoxyethyl)-5-methyl-6-phenyl-4(3H)-pyrimidinone.

References Cited by the Examiner

UNITED STATES PATENTS

| | | | |
|---|---|---|---|
| 2,621,162 | 12/52 | Baker | 260—251 |
| 2,723,977 | 11/55 | Rorig | 260—256.4 |
| 3,106,554 | 10/63 | Kober | 260—248 |

FOREIGN PATENTS 215,813  6/58  Australia.

OTHER REFERENCES

Grout et al.: Journ. Chem. Soc., pages 3540–5 (1960).
Kagawa: Endocdinology, volume 67, No. 1 (1960), pages 125–130.

NICHOLAS S. RIZZO, *Primary Examiner.*